United States Patent
Kurashige et al.

(10) Patent No.: US 11,960,101 B2
(45) Date of Patent: Apr. 16, 2024

(54) OPTICAL MEASUREMENT DEVICE AND OPTICAL MEASUREMENT METHOD

(71) Applicant: DAI NIPPON PRINTING CO., LTD., Tokyo (JP)

(72) Inventors: Makio Kurashige, Tokyo (JP); Kazutoshi Ishida, Tokyo (JP); Shumpei Nishio, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 181 days.

(21) Appl. No.: 17/605,643

(22) PCT Filed: Apr. 15, 2020

(86) PCT No.: PCT/JP2020/016530
§ 371 (c)(1),
(2) Date: Oct. 22, 2021

(87) PCT Pub. No.: WO2020/218107
PCT Pub. Date: Oct. 29, 2020

(65) Prior Publication Data
US 2022/0244558 A1    Aug. 4, 2022

(30) Foreign Application Priority Data

Apr. 22, 2019  (JP) ................. 2019-081243

(51) Int. Cl.
*G02B 27/48* (2006.01)
*G01B 11/30* (2006.01)
*G01J 1/02* (2006.01)

(52) U.S. Cl.
CPC ............ *G02B 27/48* (2013.01); *G01B 11/303* (2013.01); *G01J 1/0266* (2013.01)

(58) Field of Classification Search
CPC ....... G02B 27/48; G01B 11/303; G01J 1/0266
See application file for complete search history.

(56) References Cited

U.S. PATENT DOCUMENTS

2003/0185429 A1  10/2003 Furui
2019/0099089 A1   4/2019 Kuwayama et al.

FOREIGN PATENT DOCUMENTS

CN     108007677     5/2018
JP     2008-026147   2/2008
(Continued)

OTHER PUBLICATIONS

International Preliminary Report on Patentability, issued in the corresponding PCT application No. PCT/JP2020/016530, dated Sep. 28, 2021, 6 pages.
(Continued)

*Primary Examiner* — Ryan D Howard
(74) *Attorney, Agent, or Firm* — HSML P.C.

(57) ABSTRACT

An optical measurement device includes an optical system that focuses emitted light that is emitted from a measurement surface of a light emitting electronic display or a light emitting surface of which a speckle contrast or a sparkle contrast is to be measured; a two-dimensional sensor array having a two-dimensional sensor array surface on which the emitted light is focused, the two-dimensional sensor array capturing an image of the emitted light; and a calculation unit that calculates the speckle contrast or the sparkle contrast based on the image of the emitted light captured under an imaging condition under which a size of a light-emitting region on the measurement surface is constant, the light-emitting region contributing to formation of a diffraction limited spot of the emitted light on the two-dimensional sensor array surface.

17 Claims, 12 Drawing Sheets

(56) References Cited

FOREIGN PATENT DOCUMENTS

| JP | 2014-032371 | 2/2014 |
|---|---|---|
| TW | 201515460 | 4/2015 |

OTHER PUBLICATIONS

Written Opinion, issued in the corresponding PCT application No. PCT/JP2020/016530, dated Jun. 30, 2020, 8 pages.
Shigeo Kubota, "Speckle Measurement and its Reduction Device", Optics, 2010, vol. 39, No. 3, pp. 149-158 (English abstract included; concise explanation of relevance provided in the Written Opinion).
International Search Report, issued in the corresponding PCT application No. PCT/JP2020/016530, dated Jun. 30, 2020, 7 pages.
Japanese Office Action, issued in the corresponding Japanese patent application No. 2019-081243, dated Apr. 4, 2023, 9 pages with machine translation.
Shigeo Kubota, "Speckle Measurement and its Reduction Device", Optics, vol. 39, No. 3 (2010), pp. 149-158 (machine translation included).
Extended European Search Report issued in corresponding European Application No. 20795629.3, dated Nov. 28, 2022, 11 pages.
Koji Suzuki, "Verification of Speckle Contrast Measurement Interrelation with Observation Distance," Optical Review, 2014, vol. 21, No. 1, pp. 94-97.
Shigeo Kubota, "Very efficient speckle contrast reduction realized by moving diffuser device," Applied Optics, 2010, vol. 49, No. 23, pp. 4385-4391.
Zhaomin Tong, "Compound Speckle Characterization Method and Reduction by Optical Design," Journal of Display Technology, 2012, vol. 8, No. 3, pp. 132-137.
Antonio Pozo, "Optical characterization of display screens by speckle-contrast measurements," Proc. of SPIE, 2012, vol. 8413, No. 841317, pp. 1-6.
Masanobu Isshiki, "The Optimized Condition for Display Sparkle Contrast Measurement of Anti-Glare Cover Glass based on the Solid Understandings," SID Digest, 2019, vol. 50, Issue 1, pp. 1126-1129.
Makio Kurashige, "Estimation of Equivalent Conditions for Display Sparkle Measurement," IDW, IDW Proceedings, 2019, pp. 1114-1117.
Taiwanese Office Action, issued in the corresponding Taiwanese patent application No. 109113282, dated May 24, 2023, 13 pages.

| EFFECTIVE F-NUMBER | IMAGING DISTANCE d (m) |
|---|---|
| 8.2 | 1.91 |
| 11.4 | 1.43 |
| 16.8 | 1.00 |
| 33 | 0.57 |
| 42 | 0.47 |

OPTICAL MEASUREMENT DEVICE AND OPTICAL MEASUREMENT METHOD

TECHNICAL FIELD

The present disclosure relates to an optical measurement device and an optical measurement method.

BACKGROUND ART

Measurement of speckle generated due to coherence of laser light has been performed as disclosed in, for example, JP2014-32371A. A speckle contrast measurement device described in JP2014-32371A is configured to capture an image of laser light diffused by a movable diffusion plate and projected onto a screen and measure a speckle contrast based on the captured image.

However, according to the speckle contrast measurement device described in JP2014-32371A, there have been no effective proposals for improving the versatility of an imaging condition by ensuring compatibility with speckle contrasts obtained by other measurement devices with different imaging conditions.

DISCLOSURE OF INVENTION

The present disclosure has been made in light of the above-described circumstances, and an object of the present disclosure is to provide an optical measurement device and an optical measurement method that enable an improvement of the versatility of an imaging condition for a measurement surface of which the speckle contrast or a sparkle contrast is to be measured.

An optical measurement device according to the present disclosure includes an optical system that focuses emitted light that is emitted from a measurement surface of a light emitting electronic display or a light emitting surface of which a speckle contrast or a sparkle contrast is to be measured; a sensor having a two-dimensional sensor array surface on which the emitted light is focused, the sensor capturing an image of the emitted light; and a calculation unit that calculates the speckle contrast or the sparkle contrast based on the image of the emitted light captured under an imaging condition under which a size of a light-emitting region on the measurement surface is constant, the light-emitting region contributing to formation of a diffraction limited spot of the emitted light on the two-dimensional sensor array surface. The size of the light-emitting region is determined based on a size of the diffraction limited spot and a magnification of the optical system determined by a focal length of the optical system and an imaging distance from the measurement surface to the optical system.

In the optical measurement device according to the present disclosure, the calculation unit may calculate a speckle contrast or a sparkle contrast based on the image of the emitted light captured under a second imaging condition under which the size of the light-emitting region is equal to the size of the light-emitting region under the first imaging condition, the speckle contrast or the sparkle contrast being equivalent to a speckle contrast or a sparkle contrast based on the image of the emitted light captured under the first imaging condition.

In the optical measurement device according to the present disclosure, the second imaging condition may differ from the first imaging condition in the imaging distance.

In the optical measurement device according to the present disclosure, the second imaging condition may differ from the first imaging condition in the focal length of the optical system.

In the optical measurement device according to the present disclosure, the second imaging condition may differ from the first imaging condition in an F-number of the optical system.

The optical measurement device according to the present disclosure may further include a mechanism that adjusts at least one of the imaging distance and the focal length of the optical system so that the size of the light-emitting region that satisfies an equation given below is constant:

[Math. 1]

$$S = \frac{R}{m} \propto \frac{F\#_{image}}{m} = F\#_{image}\frac{d}{f} = F\#_{surface} \quad (1)$$

where,
S is the size of the light-emitting region,
R is the size of the diffraction limited spot,
m is the magnification of the optical system,
$F\#_{image}$ is an F-number of the optical system at an image side,
d is the imaging distance,
f is the focal length of the optical system, and
$F\#_{surface}$ is an F-number of the optical system at a side facing the measurement surface.

The optical measurement device according to the present disclosure may further include a mechanism that adjusts at least one of the imaging distance, the focal length of the optical system, and an F-number of the optical system so that the size of the light-emitting region that satisfies equations given below is constant:

[Math. 2]

$$S = \frac{R}{m}\sqrt{M} \propto \frac{F\#_{image}}{m}\sqrt{M} = F\#_{image}\frac{d}{f}\sqrt{M} = F\#_{surface}\sqrt{M} \quad (2)$$

[Math. 3]

$$M = \left[\sqrt{\frac{A_C}{A_m}}\mathrm{erf}\left(\sqrt{\frac{\pi A_m}{A_C}}\right) - \left(\frac{A_C}{\pi A_m}\right)\left\{1 - \exp\left(-\frac{\pi A_m}{A_C}\right)\right\}\right]^{-2} \quad (3)$$

where,
M is an integral parameter,
S is the size of the light-emitting region,
R is the size of the diffraction limited spot,
m is the magnification of the optical system,
$F\#_{image}$ is an F-number of the optical system at an image side,
d is the imaging distance,
f is the focal length of the optical system,
$F\#_{surface}$ is an F-number of the optical system at a side facing the measurement surface,
$A_C$ is a size of a coherent region on the two-dimensional sensor array surface,
$A_m$ is a size of uniform square detector elements on the two-dimensional sensor array surface, and
erf is a standard error function.

The optical measurement device according to the present disclosure may further include a support member that supports an object having the measurement surface.

In the optical measurement device according to the present disclosure, the calculation unit may calculate the speckle contrast or the sparkle contrast equivalent to the speckle contrast or the sparkle contrast corresponding to the first imaging condition based on the image of the emitted light captured under the second imaging condition that is within a variable range of the imaging distance and that substitutes the first imaging condition that is outside the variable range of the imaging distance.

In the optical measurement device according to the present disclosure, the optical system may include a first lens corresponding to the first imaging condition and a second lens corresponding to the second imaging condition.

The optical measurement device according to the present disclosure may further include a mechanism for moving the optical system to set each of the first imaging condition and the second imaging condition.

In the optical measurement device according to the present disclosure, the emitted light may be incoherent light or light obtained by diffusing coherent light.

An optical measurement method according to the present disclosure includes the steps of capturing an image of emitted light by focusing the emitted light on a two-dimensional sensor array surface with an optical system, the emitted light being emitted from a measurement surface of a light emitting electronic display or a light emitting surface of which a speckle contrast or a sparkle contrast is to be measured; and calculating the speckle contrast or the sparkle contrast based on the captured image of the emitted light. The step of calculating the speckle contrast or the sparkle contrast is performed based on the image of the emitted light captured under an imaging condition under which a size of a light-emitting region on the measurement surface that contributes to formation of a diffraction limited spot of the emitted light on the two-dimensional sensor array surface is constant. The size of the light-emitting region is determined based on a size of the diffraction limited spot and a magnification of the optical system determined by a focal length of the optical system and an imaging distance from the measurement surface to the optical system.

In the optical measurement method according to the present disclosure, the step of capturing the image of the emitted light may include the steps of determining an imaging condition under which the size of the light-emitting region on the measurement surface is constant, and adjusting the optical system to realize the determined imaging condition.

In the optical measurement method according to the present disclosure, the measurement surface may be an emission surface of an antiglare layer of a display device including the antiglare layer.

In the optical measurement method according to the present disclosure, the measurement surface may be an emission surface of a backlight device.

In the optical measurement method according to the present disclosure, the measurement surface may be an emission surface of a screen on which light emitted from a projector is projected.

According to the present disclosure, the versatility of an imaging condition for the measurement surface of which the speckle contrast or the sparkle contrast is to be measured can be improved.

DESCRIPTION OF EMBODIMENTS

Figure 1:
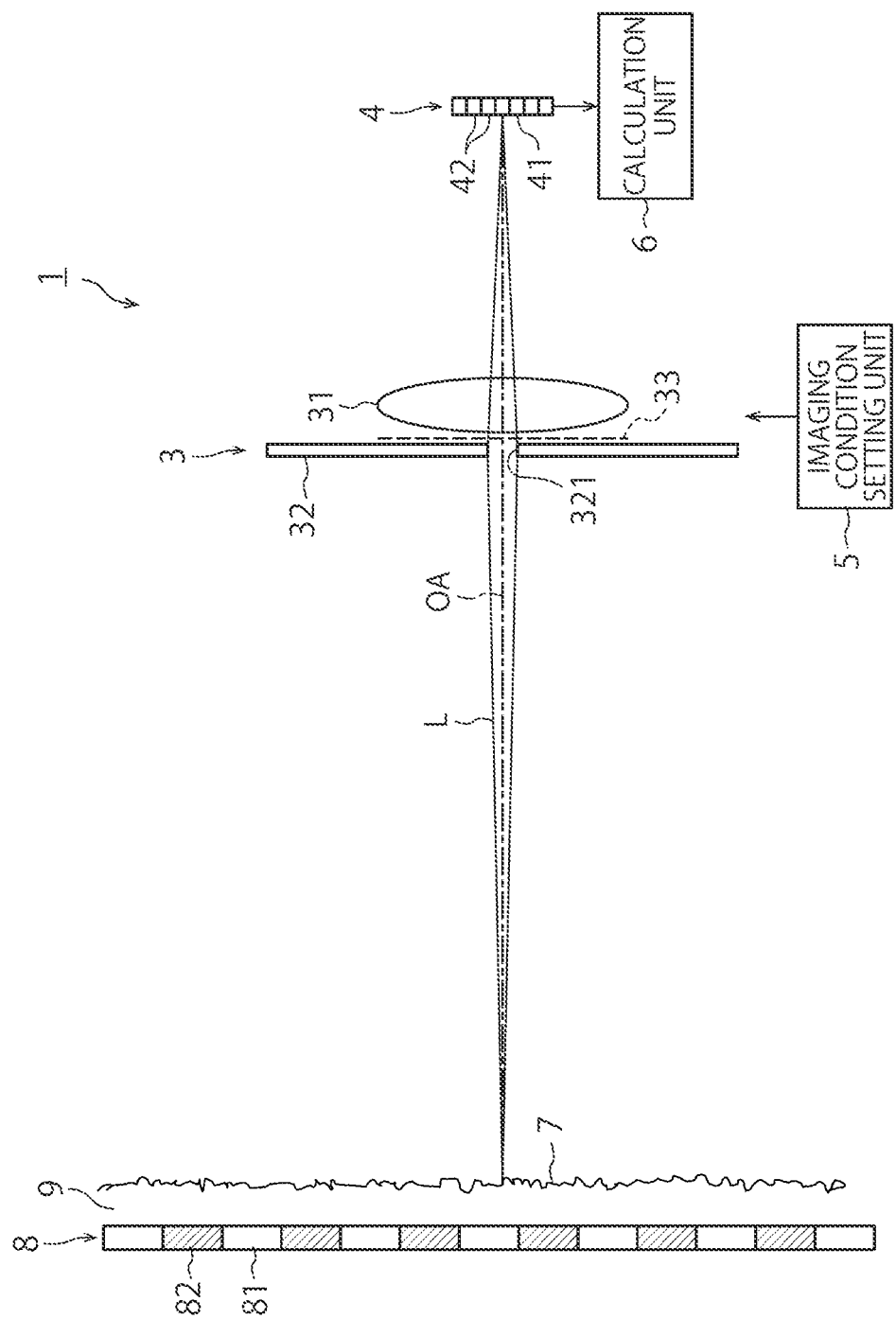
FIG. 1 illustrates an example of an optical measurement device.

An embodiment of the present disclosure will now be described with reference to the drawings. In the drawings accompanying this specification, the scales, vertical and horizontal dimensional ratios, etc., are changed and exaggerated from the actual ones as appropriate to facilitate illustration and understanding.

In addition, in this specification, the terms specifying shapes, geometric conditions, and degrees thereof, such as "equivalent" and "equal", and values of length, angle, etc., are not limited to their strict meanings, but are to be construed to include scopes expected to provide similar functions.

Figure 2:
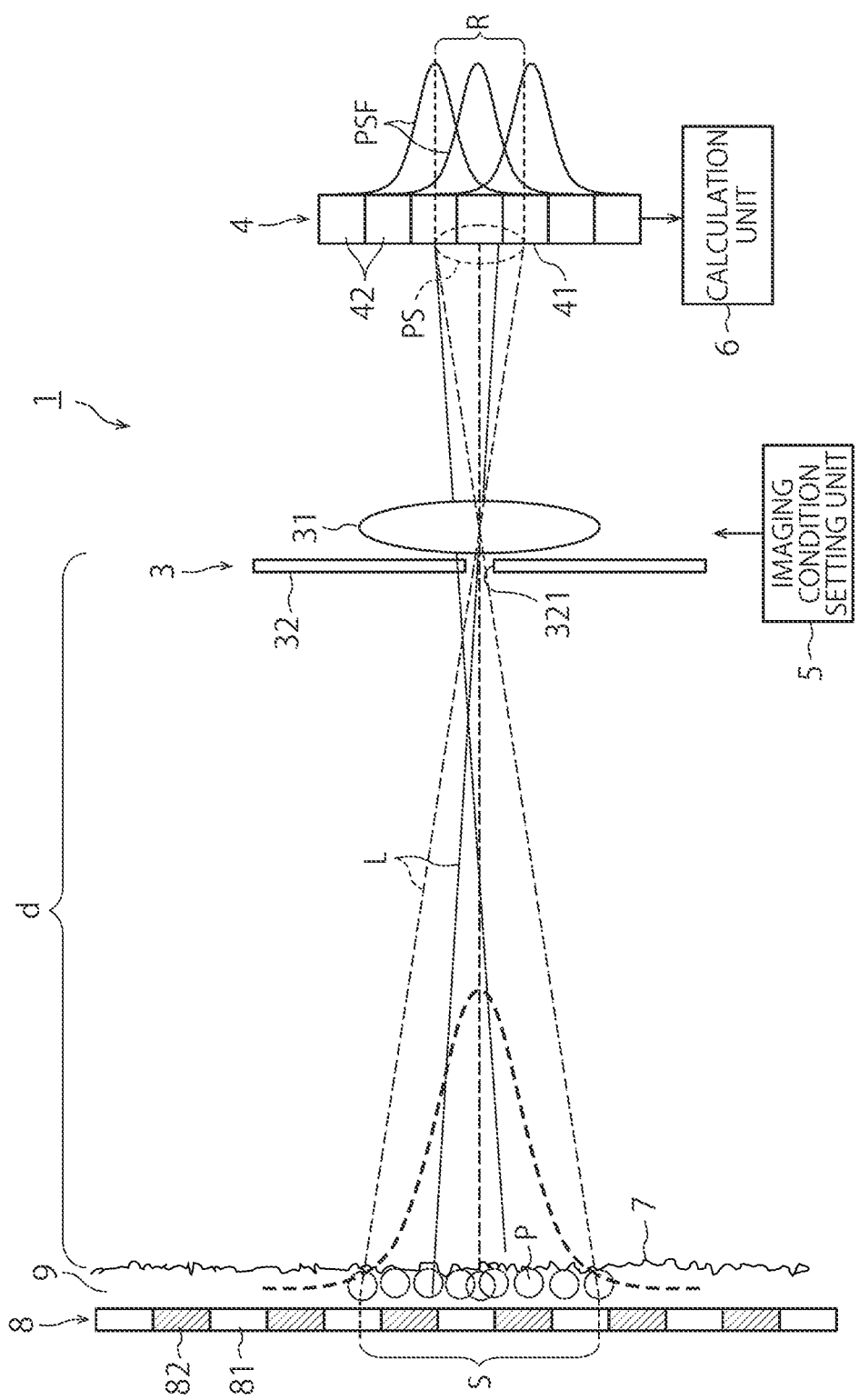
FIG. 2 is a diagram for describing an imaging condition of the optical measurement device illustrated in FIG. 1.
Figure 3:
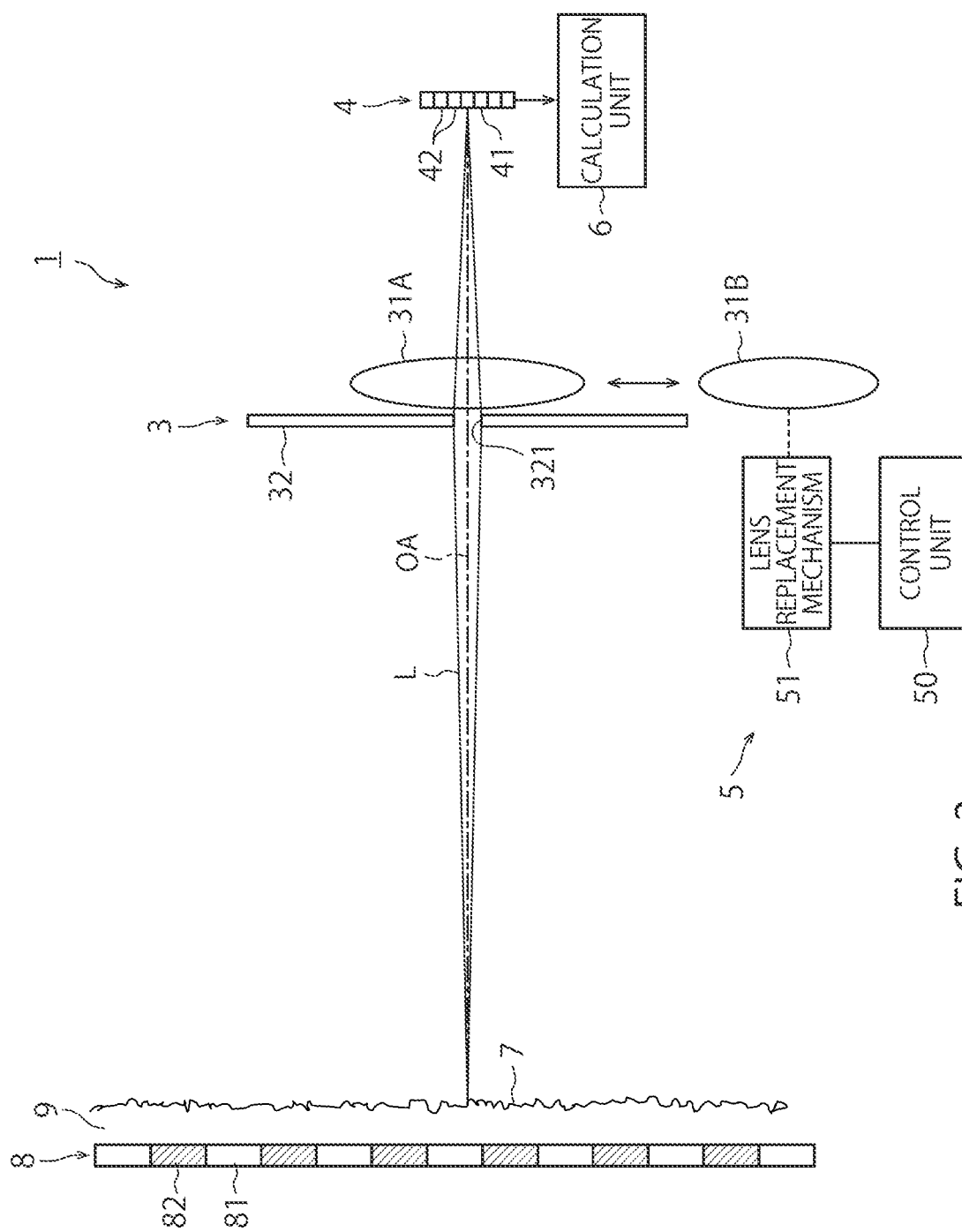
FIG. 3 illustrates a specific example of the optical measurement device illustrated in FIG. 1.
Figure 4:
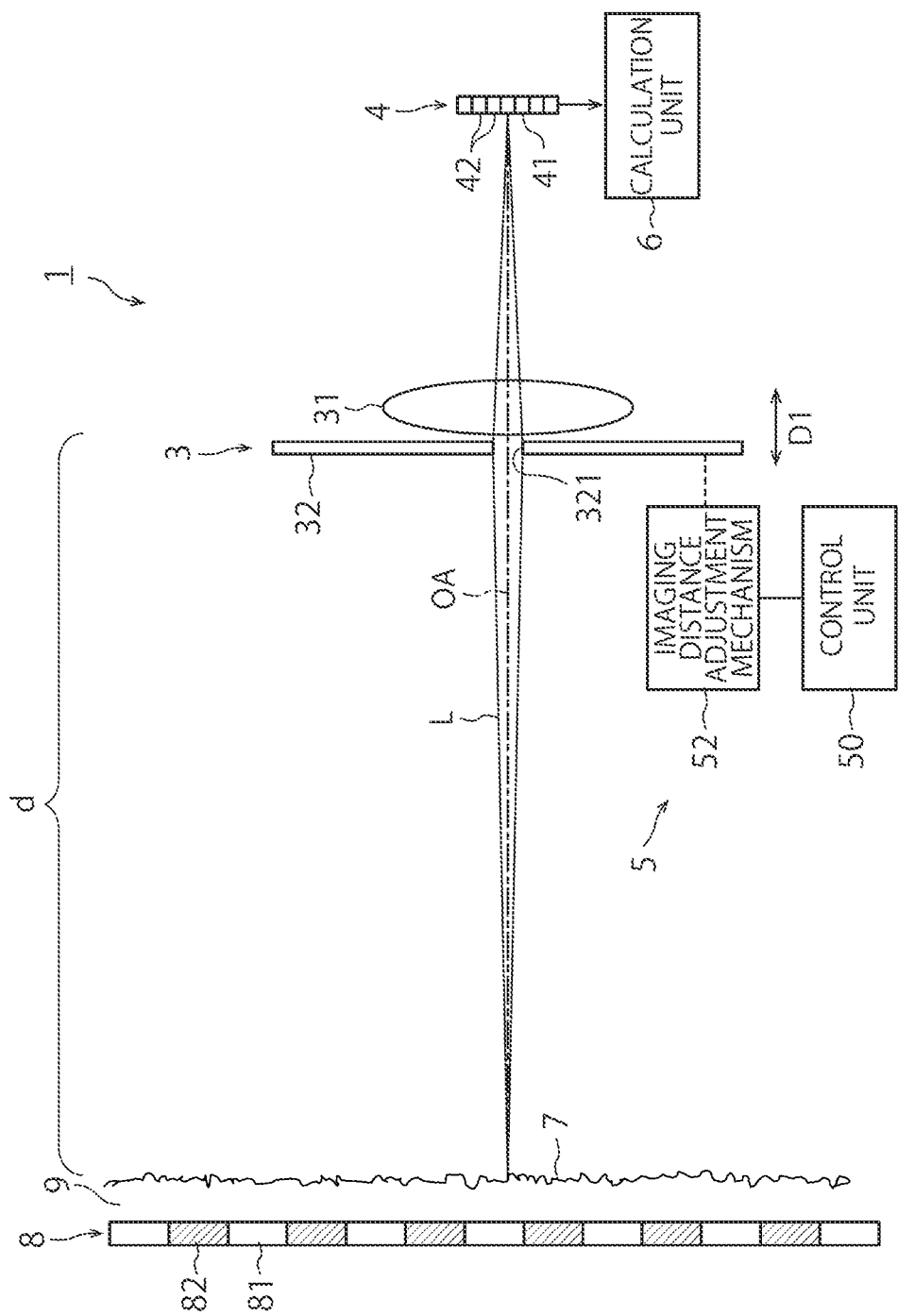
FIG. 4 is another specific example of the optical measurement device illustrated in FIG. 1.
Figure 5:
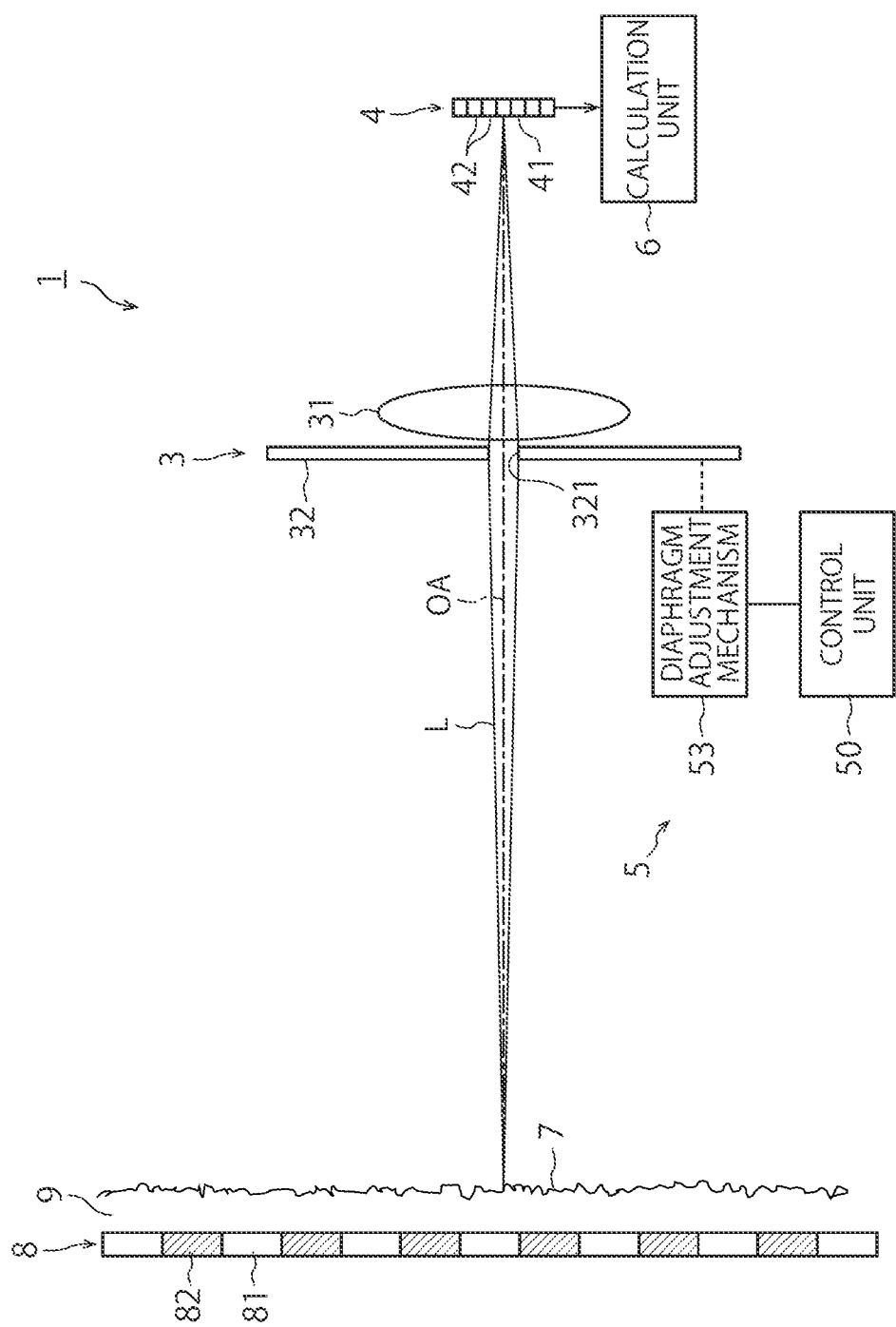
FIG. 5 is another specific example of the optical measurement device illustrated in FIG. 1.
Figure 6:
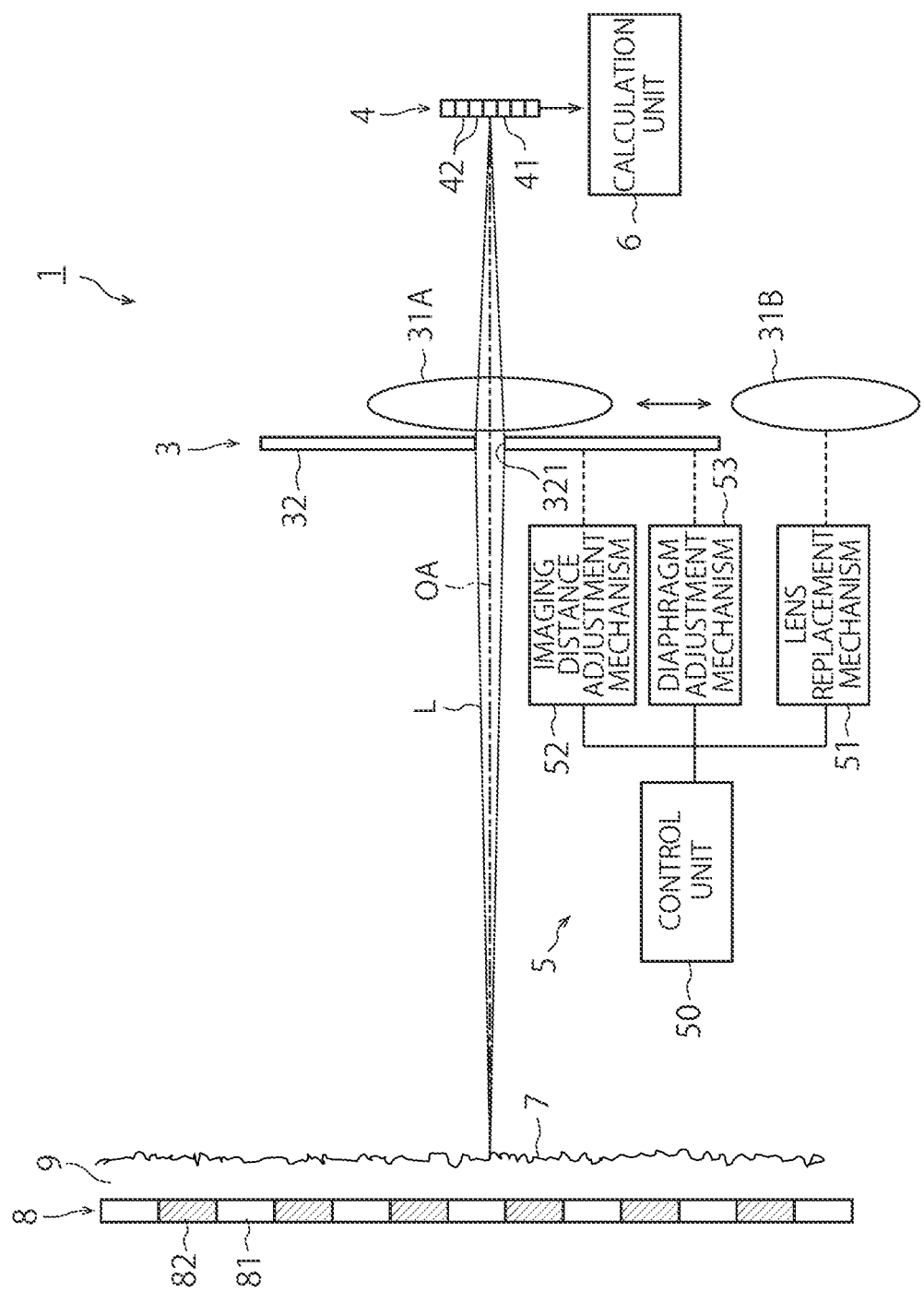
FIG. 6 is another specific example of the optical measurement device illustrated in FIG. 1.

FIG. 1 illustrates an example of an optical measurement device 1. FIG. 2 is a diagram for describing an imaging condition of the optical measurement device 1 illustrated in FIG. 1. FIG. 3 illustrates a specific example of the optical measurement device 1 illustrated in FIG. 1. FIG. 4 is another specific example of the optical measurement device 1 illustrated in FIG. 1. FIG. 5 is another specific example of the optical measurement device 1 illustrated in FIG. 1. FIG. 6 is another specific example of the optical measurement device 1 illustrated in FIG. 1.

The optical measurement device 1 illustrated in FIG. 1 may be used to measure a speckle contrast or a sparkle contrast of an optical image formed on a measurement surface 7 of a light emitting electronic display or a light emitting surface. In the following description, the measurement surface 7 of a light emitting electronic display or a light emitting surface may be referred to simply as the measurement surface 7.

In general, speckle is an irregular spatially modulated image generated as a result of interference of coherent light on a sensor surface of a visual system of an observer. The speckle contrast is a typical evaluation index for single-color speckle, and is defined by the equation given below.

[Math. 4]

$$C_S = \frac{\sigma}{\bar{I}} \quad (4)$$

In Equation (4), σ is a standard deviation of an irradiance distribution on a two-dimensional sensor surface for measurement of a single-color speckle pattern. In addition, in Equation (4), $\bar{I}$ is the average irradiance value of the single-color speckle pattern. In the field where observation is performed by a human, for example, in the field of electronic displays, the measurement unit for the denominator and the numerator in Equation (4) may be brightness instead of irradiance. In either case, the speckle contrast is a dimensionless quantity defined as a reciprocal of an S/N ratio of the speckle pattern, that is, a random noise image.

In contrast, speckle measured in the present disclosure is a spatially modulated image based on coherent light that is diffracted to reduce coherence thereof. Similarly to Equation (4), the speckle contrast of this speckle is defined as a ratio of the standard deviation to the average value of the speckle pattern.

Sparkle is an irregular spatially modulated image generated as a result of focusing on a sensor surface of a visual system of an observer due to combination of a pixel matrix of a direct viewing display and a diffusion layer disposed near a surface of the display. The sparkle contrast is a typical evaluation index for the sparkle. Similarly to Equation (4), the sparkle contrast may be defined as a ratio of the standard deviation to the average value of a sparkle pattern.

In the example illustrated in FIG. 1, the measurement surface 7 is a surface of an antiglare layer 9, which is a diffusion layer stacked on a display device 8 including a pixel matrix 81 and a black matrix 82. Thus, in the example illustrated in FIG. 1, the optical measurement device 1 is capable of measuring the sparkle contrast of the measurement surface 7. The display device 8 is a liquid crystal display device that typically includes a liquid crystal panel including the pixel matrix 81 and the black matrix 82 and a backlight device (not illustrated) disposed behind the liquid crystal panel. The backlight device may be of an edge-light type in which light emitted from a light source disposed on a side portion of a light guide plate is reflected in the light guide plate and guided toward the liquid crystal panel, or of a direct type in which a plurality of light sources are evenly arranged directly behind the liquid crystal panel. The light source of an edge-light-type backlight device may be, for example, a cold-cathode tube that emits incoherent light or a light emitting diode (LED). The light sources of a direct-type backlight device may be, for example, light emitting diodes.

The display device is not limited to the liquid crystal display device, and may instead be, for example, an organic EL display or a quantum dot (QD) display. Alternatively, the display device may instead be composed of a screen 15 and a projector 16 described below.

In the example illustrated in FIG. 1, the optical measurement device 1 includes an optical system 3, a two-dimensional sensor array 4, an imaging condition setting unit 5, and a calculation unit 6 as a configuration for measuring the sparkle contrast. These components of the optical measurement device 1 will now be described in detail.

Optical System 3

The optical system 3 includes a lens 31 and a diaphragm 32 having an opening 321.

The optical system 3 refracts light L emitted from the measurement surface 7 of which the sparkle contrast is to be measured so that the emitted light L is focused on a two-dimensional sensor array surface 41 of the two-dimensional sensor array 4.

The parameters of the optical system 3 affect the magnitude of the sparkle contrast.

For example, as the size of the opening 321 in the diaphragm 32 decreases, that is, as the F-number of the lens 31 increases, the influence of diffraction of the emitted light L at the opening 321 in the diaphragm 32 increases. When the diffraction of the emitted light L increases, the size of a diffraction limited spot, that is, the Airy disc, of the emitted light L focused on the two-dimensional sensor array surface 41 increases. Accordingly, the diffraction limited spot is not disposed within a single pixel 42 of the two-dimensional sensor array 4 but spreads into neighboring pixels 42.

The spreading of the diffraction limited spot occurs for each of diffraction limited spots focused on respective ones of the pixels 42 of the two-dimensional sensor array 4. Therefore, in each pixel 42, rays of the emitted light L that have passed through the antiglare layer 9 at different locations overlap on the pixel 42, causing averaging of sparkle patterns. Similarly to the case of sparkle, similar averaging also occurs when the speckle contrast is measured while the spatial coherence is reduced by, for example, a rotating diffusion plate.

The speckle contrast and the sparkle contrast decrease as the degree of averaging of the speckle and sparkle patterns on the pixels 42 increases. In other words, as the F-number of the lens 31 increases, the speckle contrast and the sparkle contrast decrease due to the averaging effect on the pixels 42.

The speckle contrast and the sparkle contrast decrease also when the F-number is so small such that the average particle diameter of the speckle or sparkle patterns formed on the two-dimensional sensor array surface 41 is less than the size of the pixels 42. This is because a light density distribution is generated in each pixel 42 due to spreading of the diffraction limited spot being too small relative to the pixels 42, and the distribution causes averaging of the speckle or sparkle pattern in each pixel 42. Thus, when the F-number of the lens 31 is too small, the speckle contrast and the sparkle contrast decrease due to the averaging effect in each pixel 42.

As described above, the F-number of the lens 31 affects the speckle contrast and the sparkle contrast. The contrasts are reduced due to the averaging effect caused when the F-number is increased and different patterns overlap on the pixels 42. The speckle or sparkle contrast is also reduced due to the averaging effect in each pixel 42 caused when the F-number is reduced.

In the example illustrated in FIG. 1, the optical system 3 includes a single lens 31. However, the optical system 3 may instead include a plurality of lenses. In such a case, the lenses may have a combination of powers suitable for reducing the aberrations of the emitted light L. The optical system 3 may also include an optical filter 33. More specifically, a Y filter, an XYZ filter, an RGB filter, a linearly polarizing filter, a circularly polarizing filter, an ND filter, or the like may be provided. FIG. 1 illustrates an example in which the optical filter 33 is disposed between the diaphragm 32 and the lens 31. However, the number of optical filters 33 and positions thereof are not limited to those in the example illustrated in FIG. 1.

Two-Dimensional Sensor Array 4

The two-dimensional sensor array 4 has the two-dimensional sensor array surface 41 on which the light L emitted from the measurement surface 7 is focused, and captures an image of the emitted light L.

The two-dimensional sensor array 4 includes the pixels 42 that are adjacent to each other, and surfaces of the pixels 42 form the two-dimensional sensor array surface 41. The emitted light L received by the pixels 42 is photoelectrically converted into an electric signal, and the thus-obtained electric signal is used to calculate the speckle contrast or the sparkle contrast.

The two-dimensional sensor array 4 is an image sensor including a solid-state imaging device, and may be, for example, a charge coupled device (CCD) sensor or a CMOS sensor.

Imaging Condition Setting Unit 5

The imaging condition setting unit 5 sets an imaging condition of the measurement surface 7, that is, an imaging condition of the emitted light L, in the optical measurement device 1. The imaging condition setting unit 5 may include a mechanism for moving, or adjusting, the optical system 3 to set the imaging condition of the measurement surface 7.

For example, as illustrated in FIG. 3, the imaging condition setting unit 5 may include a lens replacement mechanism 51 that selectively moves one of a plurality of lenses 31A and 31B having different focal lengths to an optical axis OA and a control unit 50 for controlling the operation of the lens replacement mechanism 51. Although two lenses are provided in the example illustrated in FIG. 3, the lens replacement mechanism 51 may instead be configured to move three or more lenses. The form of the lens replacement mechanism 51 is not particularly limited. For example, the lens replacement mechanism 51 may include an actuator with a power source, such as a motor. According to the example illustrated in FIG. 3, the imaging condition setting unit 5 is capable of setting or changing the magnification of the optical system 3 as an imaging condition.

In addition, as illustrated in FIG. 4, for example, the imaging condition setting unit 5 may include an imaging distance adjustment mechanism 52 that adjusts an imaging distance d by moving the optical system 3 in an optical axis direction D1 and a control unit 50 that controls the operation of the imaging distance adjustment mechanism 52. The form of the imaging distance adjustment mechanism 52 is not particularly limited. For example, the imaging distance adjustment mechanism 52 may include an actuator with a power source, such as a motor. According to the example illustrated in FIG. 4, the imaging condition setting unit 5 is capable of setting or changing the imaging distance d from the measurement surface 7 to the optical system 3 as an imaging condition.

In addition, as illustrated in FIG. 5, for example, the imaging condition setting unit 5 may include a diaphragm adjustment mechanism 53 that adjusts the size of the opening 321 in the diaphragm 3. The diaphragm adjustment mechanism 53 may include, for example, an actuator, such as a motor. According to the example illustrated in FIG. 5, the imaging condition setting unit 5 is capable of setting or changing the F-number of the optical system 3 as an imaging condition.

In addition, as illustrated in FIG. 6, the imaging condition setting unit 5 may include all of the mechanisms 51, 52, and 53 for adjusting the optical system 3 illustrated in FIGS. 3 to 5.

The imaging condition setting unit 5 may be capable of changing the size of the pixels 42 of the two-dimensional sensor array 4 as an imaging condition.

To ensure compatibility between the speckle contrasts or the sparkle contrasts based on the image of the emitted light L captured under different imaging conditions, the imaging condition setting unit 5 having the above-described structure sets an imaging condition so that the size of a light-emitting region on the measurement surface 7 that contributes to formation of the diffraction limited spot of the emitted light L on the two-dimensional sensor array surface 41 is constant.

For example, the control unit 50 may store or determine a second imaging condition that corresponds to a first imaging condition in advance, the second imaging condition being an imaging condition under which the size of the light-emitting region on the measurement surface 7 that contributes to formation of the diffraction limited spot of the emitted light L on the two-dimensional sensor array surface 41 is constant, or in other words equal to that under the first imaging condition. The control unit 50 may control the operations of the mechanisms 51, 52, and 53, or in other words adjust the optical system 3 to set the second imaging condition stored in advance. The control unit 50 may be formed of hardware, such as a CPU and a memory. A portion of the control unit 50 may be formed of software.

The detailed definition of the imaging condition under which the size of the light-emitting region on the measurement surface 7 that contributes to formation of the diffraction limited spot of the emitted light L on the two-dimensional sensor array surface 41 is constant will be described below.

Calculation Unit 6

The calculation unit 6 calculates the speckle contrast or the sparkle contrast based on the image of the emitted light L captured under the imaging condition under which the size of the light-emitting region on the measurement surface 7 that contributes to formation of the diffraction limited spot of the emitted light L on the two-dimensional sensor array surface 41 is constant. More specifically, the calculation unit 6 calculates the speckle contrast or the sparkle contrast based on the image of the emitted light L captured under the second imaging condition under which the size of the light-emitting region on the measurement surface 7 that contributes to formation of the diffraction limited spot of the emitted light L on the two-dimensional sensor array surface 41 is equal to that under the first imaging condition. The calculation unit 6 outputs the calculated speckle contrast or sparkle contrast. The calculated speckle contrast or sparkle contrast may be output to a memory that stores the calculation result or a display that displays the calculation result. The calculation unit 6 may be formed of hardware, such as a CPU and a memory. A portion of the calculation unit 6 may be formed of software.

The detailed definition of the imaging condition under which the size of the light-emitting region on the measurement surface 7 that contributes to formation of the diffraction limited spot of the emitted light L on the two-dimensional sensor array surface 41 is constant will now be described.

The size of the light-emitting region on the measurement surface 7 that contributes to formation of the diffraction limited spot of the emitted light L on the two-dimensional sensor array surface 41 is determined by the equation given below based on the size of the diffraction limited spot and the magnification of the optical system 3 determined by the focal length of the optical system 3 and the imaging distance d from the measurement surface 7 to the optical system 3.

[Math. 5]

$$S = \frac{R}{m} \propto \frac{F\#_{image}}{m} = F\#_{image}\frac{d}{f} = F\#_{surface} \quad (1)$$

In Equation (1), S is the size of the light-emitting region on the measurement surface 7 that contributes to formation of the diffraction limited spot of the emitted light L on the two-dimensional sensor array surface 41; R is the size of the diffraction limited spot of the emitted light L focused on the two-dimensional sensor array surface 41, that is, the size of the Airy disc; m is the magnification of the optical system 3, that is, the magnification of the lens 31; $F\#_{image}$ is the F-number of the optical system 3 on the image side; d is the above-described imaging distance; f is the focal length of the optical system 3; and $F\#_{surface}$ is the F-number of the optical system 3 on the side facing the measurement surface 7 (object side). The definitions of these parameters also apply to Equation (2) given below. In Equation (1), $F\#_{image}$/m which is equal to $F\#_{surface}$·d/f, is proportional to R/m. Therefore, setting $F\#_{image}$/m or $F\#_{surface}$·d/f constant is equivalent to setting S constant.

As illustrated in FIG. 2, the light L emitted from the measurement surface 7 is focused on the two-dimensional sensor array surface 41 to form a diffraction limited spot PS, that is, a spot image that spreads over a plurality of pixels 42 in accordance with a point spread function (PSF). In FIG. 2, for convenience of illustration of the diffraction limited spot PS that spreads in accordance with the PSF, the two-dimensional sensor array 4 is enlarged from that shown in FIG. 1.

Thus, the diffraction limited spot PS centered on one pixel 42 is received not only by that pixel 42 but also by neighboring pixels 42. This implies that the diffraction limited spot PS on one pixel 42 is formed by the contribution of the light L emitted from a plurality of light emitting points P on the measurement surface 7.

The light-emitting region on the measurement surface 7 that contributes to formation of the diffraction limited spot PS of the emitted light L on the two-dimensional sensor array surface 41 may be regarded as a collection of the plurality of light emitting points P. Therefore, as illustrated in FIG. 2, the size of the light-emitting region may be regarded as the size S of an image formed by projecting the diffraction limited spot PS on the two-dimensional sensor array 4 onto the measurement surface 7 through the optical system 3. In FIG. 2, the projection image of the diffraction limited spot PS on the measurement surface 7 is illustrated as a projection image of the PSF. In the example illustrated in FIG. 2, the projection image of the diffraction limited spot PS on the measurement surface 7 is larger than the diffraction limited spot PS. This is due to the influence of the magnification of the optical system 3.

According to the present disclosure, it has been found that when the size S of the light-emitting region on the measurement surface 7 that contributes to formation of the diffraction limited spot PS is constant, the compatibility between the speckle contrasts or the sparkle contrasts based on the image of the emitted light L captured under different imaging conditions can be ensured. The reason why the compatibility can be ensured will now be described.

When the light L emitted from each light emitting point P on the measurement surface 7 and incident on a pixel 42 is incoherent, or is coherent but the coherence thereof is reduced by diffusion, the rays of light L emitted from the respective light emitting points P on the measurement surface 7 hardly interfere with each other on the pixel 42, and wavefronts thereof simply overlap.

As a result, a diffraction limited spot group is formed in which the speckle or the sparkle is averaged in accordance with the number of light emitting points P on the measurement surface 7 that correspond to the pixel 42. The degree of averaging of the speckle or the sparkle depends on the number of light emitting points P on the measurement surface 7 that correspond to the pixel 42, that is, the size S of the light-emitting region on the measurement surface 7.

Therefore, in the case where the size S of the light-emitting region on the measurement surface 7 is constant, even when the imaging condition varies, the degree of averaging of the speckle or the sparkle is constant, and speckle contrasts or sparkle contrasts that are substantially equal to each other can be obtained.

Since the compatibility between the speckle contrasts or the sparkle contrasts can be ensured for the above reasons, the imaging condition setting unit 5 sets the imaging condition under which S is constant, and the calculation unit 6 calculates the speckle contrast or the sparkle contrast based on the image of the emitted light L captured under the imaging condition under which S is constant. In other words, the imaging condition setting unit 5 adjusts at least one of the imaging distance d and the focal length f of the optical system 3 so that S is constant, and the calculation unit 6 calculates the speckle contrast or the sparkle contrast based on the image of the emitted light L captured under the imaging condition set as a result of the adjustment.

According to the above-described configuration, speckle contrasts or sparkle contrasts that are compatible can be obtained based on images of the emitted light L captured under different imaging conditions, and therefore the versatility of the imaging condition can be increased.

More specifically, the calculation unit 6 is capable of calculating a speckle contrast or a sparkle contrast based on the image of the emitted light L captured under a second imaging condition under which the size S of the light-emitting region is equal to that under a first imaging condition, the speckle contrast or the sparkle contrast being equivalent to a speckle contrast or a sparkle contrast based on the image of the emitted light L captured under the first imaging condition.

The first imaging condition may be either an imaging condition within a variable range of the imaging distance of the optical measurement device 1 or an imaging condition outside the variable range of the imaging distance of the optical measurement device 1.

When the first imaging condition is an imaging condition outside the variable range of the imaging distance of the optical measurement device 1, a speckle contrast or a sparkle contrast that substitutes the speckle contrast or the sparkle contrast under the first imaging condition can be calculated based on the image of the emitted light L captured under the second imaging condition that is within the variable range of the imaging distance of the optical measurement device 1. Thus, structural limitations to the optical measurement device 1 for the measurement of the speckle contrast or the sparkle contrast can be reduced.

When the first imaging condition is an imaging condition within the variable range of the imaging distance of the optical measurement device 1, both the first imaging condition and the second imaging condition can be selectively set. Accordingly, the speckle contrast or the sparkle contrast measured under the first imaging condition and the speckle contrast or the sparkle contrast measured under the second imaging condition may be appropriately compared with each other by using a single optical measurement device 1.

The second imaging condition may differ from the first imaging condition in the imaging distance d. In such a case, as illustrated in FIG. 4, the imaging condition setting unit 5 may adjust the imaging distance d by moving the optical system 3 in the direction of the optical axis OA with the imaging distance adjustment mechanism 52. Thus, the second imaging condition or both the second imaging condition and the first imaging condition may be set.

The second imaging condition may differ from the first imaging condition in the focal length of the optical system 3. In such a case, as illustrated in FIG. 3, the imaging condition setting unit 5 may set one of the lenses 31A and 31B to be used for imaging by using the lens replacement mechanism 51. Thus, the second imaging condition or both the second imaging condition and the first imaging condition may be set. In this case, the lens 31A may function as a first lens corresponding to the first imaging condition, and the lens 31B may function as a second lens corresponding to the second imaging condition.

The second imaging condition may differ from the first imaging condition in the F-number of the optical system 3. In such a case, as illustrated in FIG. 5, the imaging condition setting unit 5 may adjust the size of the opening 321 in the diaphragm 53 by using the diaphragm adjustment mechanism 53. Thus, the second imaging condition or both the second imaging condition and the first imaging condition may be set.

When the first imaging condition and the second imaging condition differ in F-number, the calculation unit 6 calculates the speckle contrast or the sparkle contrast based on the image of the emitted light L captured under an imaging condition under which the size S of the light-emitting region that satisfies the equation given below is constant. More specifically, the imaging condition setting unit 5 adjusts not only the F-number of the optical system 3 but also the imaging distance d and the focal length f of the optical system 3 as necessary so that S obtained by the equation given below is constant, and the calculation unit 6 calculates the speckle contrast or the sparkle contrast based on the image of the emitted light L captured under the imaging condition set as a result of the adjustments.

[Math. 6]

$$S = \frac{R}{m}\sqrt{M} \propto \frac{F\#_{image}}{m}\sqrt{M} = F\#_{image}\frac{d}{f}\sqrt{M} = F\#_{surface}\sqrt{M} \quad (2)$$

[Math. 7]

$$M = \left[\sqrt{\frac{A_c}{A_m}}\mathrm{erf}\left(\sqrt{\frac{\pi A_m}{A_C}}\right) - \left(\frac{A_c}{\pi A_m}\right)\left\{1 - \exp\left(-\frac{\pi A_m}{A_c}\right)\right\}\right]^{-2} \quad (3)$$

In Equation (3), M is an integrated parameter; $A_C$ is the size of a coherent region on the two-dimensional sensor array surface 41; $A_C$ is the size of the diffraction limited spot of the emitted light L formed on the two-dimensional sensor array surface 41, and is equivalent to R in Equation (2); $A_m$ is the size of uniform square detector elements on the two-dimensional sensor array surface 41, and corresponds to the size of each of the pixels 42 illustrated in FIG. 1; and erf is a standard error function. The definitions of these parameters also apply to Equation (6) given below.

When the speckle contrast or the sparkle contrast is calculated based on the image of the emitted light L captured under the imaging condition under which S defined by Equation (2) is constant, equivalent speckle contrasts or sparkle contrasts can be obtained even under imaging conditions that differ in the F-number of the optical system 3.

Examples of experiments performed to verify the effect of the optical measurement device 1 having the above-described configuration will now be described. Before describing the experiment examples, an example in which a speckle contrast is measured by using completely coherent light that is not diffused will be described as a reference example.

Reference Example

Figure 7:
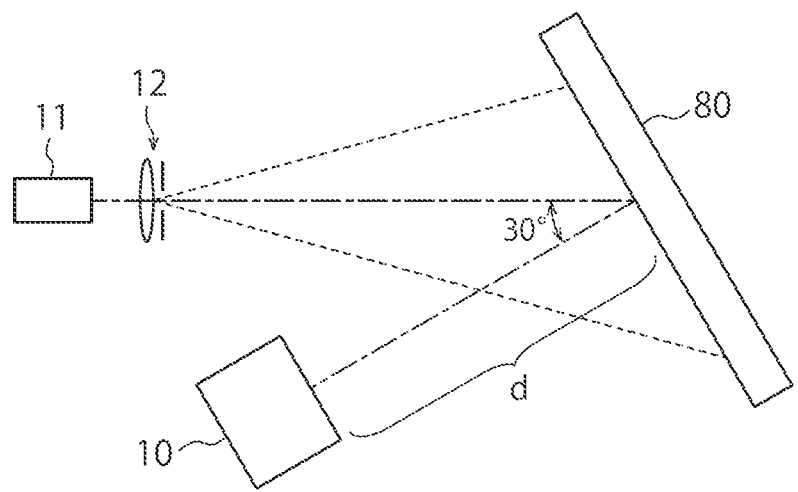
FIG. 7 illustrates a measurement system for measuring a speckle contrast by using coherent light as a reference example for the optical measurement device illustrated in FIG. 1.

FIG. 7 is a measurement system for measuring a speckle contrast by using coherent light with extremely high temporal and spatial coherence.

The measurement system illustrated in FIG. 7 includes a He—Ne laser 11 that emits laser light with a wavelength of 543.7 nm as coherent light, a spatial filter 12 including a lens and a pinhole, a screen 80, and an imaging camera 10.

A diffuse-reflection target SRT-99-050 manufactured by Labsphere, Inc. was used as the screen 80. As illustrated in FIG. 7, the screen 80 was disposed at a position 1.2 m away from the He—Ne laser 11 such that the incident angle of the laser light was 30°. The imaging camera 10 had a CCD pixel size of 6.45 µm, and a lens with a focal length of 50 mm was selected. An imaging distance d from the screen 80 to the imaging camera 10 was fixed to 0.4 m.

In the measurement system illustrated in FIG. 7, the laser light emitted from the He—Ne laser 11 is adjusted to be close to an ideal spherical wave by the spatial filter 12, is incident on the screen 80, and is diffused and reflected by the screen 80. The diffused and reflected laser light is received by the imaging camera 10, and the speckle contrast is measured.

In the measurement example illustrated in FIG. 7, the effective F-number of the optical system of the imaging camera 10 was changed in the range of 3.2 to 42, and the speckle contrast was measured for each effective F-number. The measurement values of the speckle contrast obtained by the measurement were compared with calculation values of the speckle contrast described below.

The calculation values of the speckle contrast are values obtained by calculation based on the theory described below.

When completely coherent light that is not diffused is used as illustrated in FIG. 7, the dependency of the speckle contrast on the effective F-number of the imaging camera 10 is low. This is because the coherent region on the imaging camera 10 is very large when coherent light with extremely high temporal and spatial coherence is used. In contrast, an average speckle size R, which is substantially equivalent to the above-described size R of the diffraction limited spot, depends on the effective F-number of the imaging camera 10 as in the equation given below.

[Math. 8]

$$R = \frac{4}{\pi} F\#_{image} \lambda \tag{5}$$

In Equation (5), X is the wavelength of the coherent light.

The speckle is integrated in a plurality of limited areas of the sensor included in the imaging camera 10. The speckle contrast of the integrated speckle is defined by the equation given below.

[Math. 9]

$$C_S = \frac{1}{\sqrt{M}} \tag{6}$$

The integrated parameter M in Equation (6) is described in detail above in the description of Equation (3).

Figure 8:
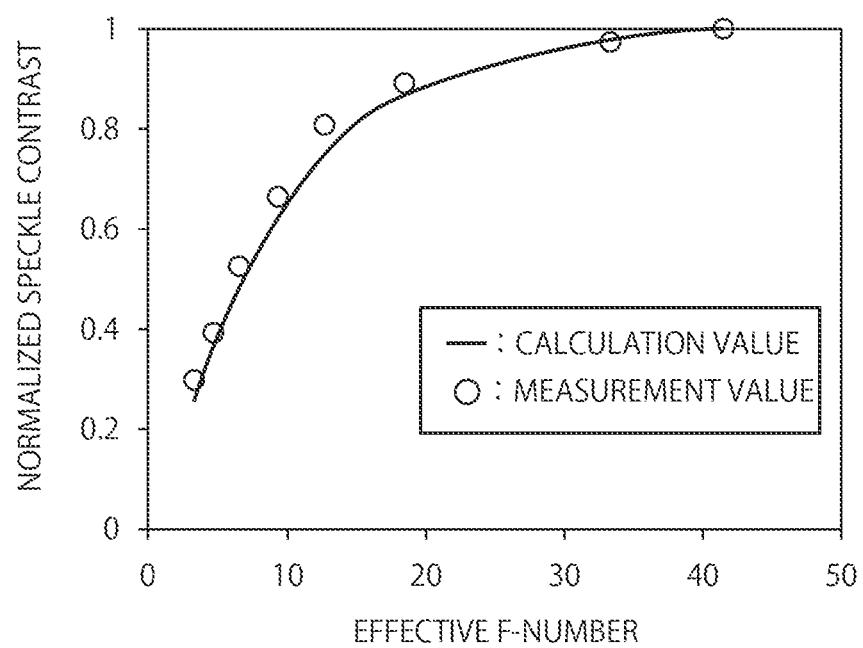
FIG. 8 illustrates the result of measurement of the speckle contrast performed by the measurement system illustrated in FIG. 7.

FIG. 8 is a graph showing a comparison between the calculation values of the speckle contrast calculated from Equation (6) and measurement values of the speckle contrast measured by the measurement system illustrated in FIG. 7. In FIG. 8, the measurement values and the calculation values are normalized so that the values obtained when the effective F-number is 42 are 1.

As is clear from FIG. 8, the measurement values of the speckle contrast match the calculation values.

FIG. 8 shows that even when coherent light with extremely high temporal and spatial coherence is used so that the dependency of the speckle contrast on the effective F-number is low (spatial overlapping of speckle pattern intensities does not occur), the speckle contrast is not constant in response to changes in the effective F-number, and decreases as the effective F-number decreases. In other words, FIG. 8 verifies that the speckle contrast is reduced due to the averaging effect in the pixels.

Experiment Examples

Figures 9, 10:
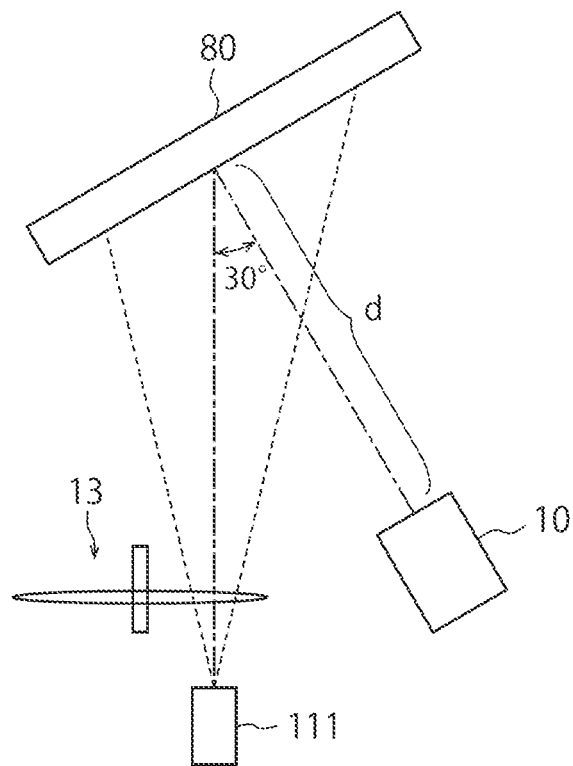
FIG. 9 illustrates a measurement system for measuring a speckle contrast by using diffused coherent light as an experiment example of the optical measurement device illustrated in FIG. 1.
FIG. 10 shows the effective F-number and the imaging distance as measurement conditions of the measurement system illustrated in FIG. 9.

Measurement examples in which the speckle contrast was measured by using diffused coherent light will now be described as experiment examples of the optical measurement device 1 illustrated in FIG. 1. FIG. 9 illustrates a measurement system for measuring the speckle contrast by using coherent light in a diffused state that is temporally changed.

The measurement system illustrated in FIG. 9 includes an SHG laser 111 that emits laser light with a wavelength of 533 nm as coherent light, a rotating diffuser 13, a screen 80, and an imaging camera 10.

The rotating diffuser 13 diffuses the laser light emitted by the SHG laser 111 to reduce the coherence. The laser light is diffused by the rotating diffuser 13 in the form of spot light having a diameter of about 1 cm, and is incident on the screen 80 that is positioned 1.2 m away from the rotating diffuser 13. The screen 80 diffuses and reflects the diffused light from the rotating diffuser 13 toward the imaging camera 10. The diffused and reflected light is received by the imaging camera 10, and the speckle contrast is measured.

When the rotating diffuser 13 is used as described above, the averaging effect occurs due to overlapping of different speckle pattern intensities on the sensor. In this case, the speckle contrast is defined by the equation given below.

[Math. 10]

$$C_S \propto \frac{1}{\sqrt{K}} \propto \frac{NA_{image}}{NA_{illumination}} \tag{7}$$

In Equation (7), K is a coefficient of spatial multiplicity; and $NA_{image}$ and $NA_{illumination}$ are numerical apertures of the imaging camera 10 and the SHG laser 111, respectively, with respect to the screen 80.

In the experiment examples, measurements were performed to obtain actual measurement values of the speckle contrast. First, as a first measurement under imaging conditions based on Equation (1) given above, the combination of the effective F-number $F\#_{image}$ and the imaging distance d was changed so that S was constant, as shown in FIG. 10, and the speckle contrast was measured based on the image of the laser light captured under the imaging conditions of each combination. In the first measurement, the focal length f of the lens included in the imaging camera 10 was constant.

Figure 11:
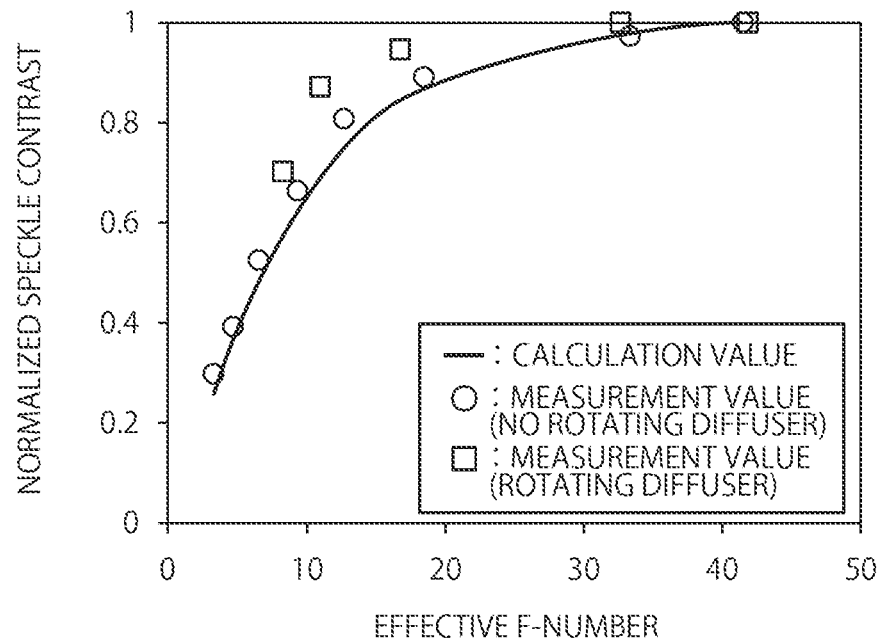
FIG. 11 illustrates the result of measurement of the speckle contrast performed by the measurement system illustrated in FIG. 9 under the measurement conditions illustrated in FIG. 10.

FIG. 11 is a graph showing the result of measurement of the speckle contrast in the first measurement. More specifically, in FIG. 11, the measurement values plotted with rectangles are the measurement values obtained in the first measurement. In addition to the measurement values obtained in the first measurement, FIG. 11 also shows the measurement values and the calculation values shown in FIG. 8 obtained when coherent light with extremely high temporal and spatial coherence is used.

FIG. 11 shows that when the speckle contrast is measured by using diffused coherent light under the imaging conditions under which S is constant, measurement results similar to those obtained when coherent light with extremely high temporal and spatial coherence is used can be obtained. Accordingly, assuming that reduction in the speckle contrast due to the averaging effect in the pixels is excluded, it has been verified that the speckle contrast is constant when S is constant.

Next, in the experiment examples, as a second measurement under imaging conditions based on Equation (1), the speckle contrast was measured by using each of two lenses having different focal lengths. The focal lengths f of the two lenses were 35 mm and 50 mm. The imaging distance d for the lens with the focal length f of 35 mm was 0.42 mm, and the imaging distance d for the lens with the focal length f of 50 mm was 0.62 m. In the second measurement, d/f in Equation (1) was set to a constant value so that S was constant. In the second measurement, the CCD pixel size of the imaging camera 10 was 9 μm.

Figure 12:
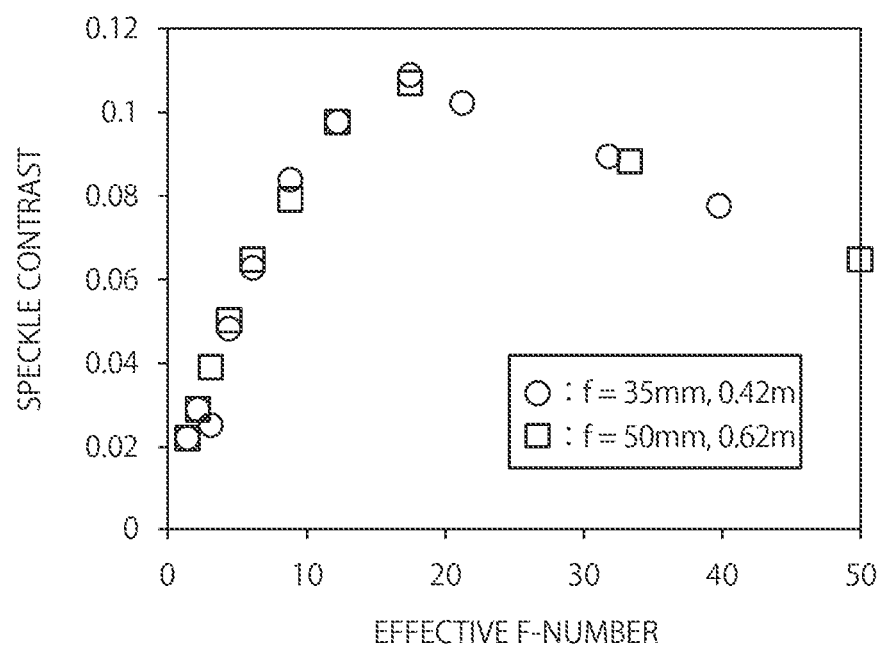
FIG. 12 illustrates the result of measurement of the speckle contrast performed by the measurement system illustrated in FIG. 9 under measurement conditions different from those illustrated in FIG. 10.

FIG. 12 is a graph showing the result of the second measurement. FIG. 12 shows that even under different imaging conditions, the speckle contrasts are substantially the same when S is constant.

As a result of the above-described experiment examples, the effect of the optical measurement device 1 that equivalent speckle contrasts can be obtained by setting S constant was verified.

Although some specific examples of an embodiment have been described, the above-described specific examples are not intended to limit the embodiment. The above-described embodiment may be implemented in various other specific examples, and various omissions, replacements, alterations, or additions of components are possible without departing from the gist of the embodiment.

The above-described embodiment will be further described by describing other specific examples with reference to the drawings. In the following description and drawings referred to in the following description, parts that are structured similarly to those in the above-described specific examples are denoted by the same reference signs as those used to denote corresponding parts in the above-described specific examples, and redundant description thereof is omitted.

First Modification

Figure 13:
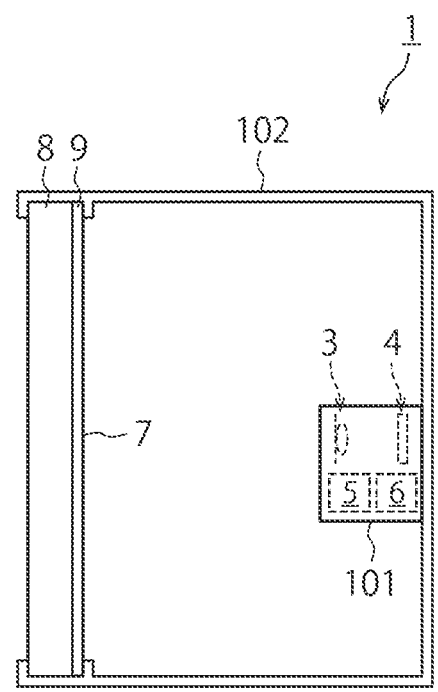
FIG. 13 illustrates a modification of the optical measurement device illustrated in FIG. 1.

FIG. 13 illustrates a modification of the optical measurement device 1 illustrated in FIG. 1 as a first modification. In the example illustrated in FIG. 13, a main portion of the optical measurement device 1 composed of an optical system 3, a two-dimensional sensor array 4, an imaging condition setting unit 5, and a calculation unit 6 is disposed in a housing 101. The optical measurement device 1 further includes a support member 102 that extends from the housing 101 toward a display device 8. The support member 102 supports an antiglare layer 9, which is an object having a measurement surface 7, and the display device 8 such that a constant imaging distance is provided between the measurement surface 7, which is a surface of the antiglare layer 9, and the optical system 3. In the example illustrated in FIG. 13, the support member 102 supports the display device 8 and the antiglare layer 9 by being fitted to portions of the display device 8 and the antiglare layer 9. However, the form of the support member 102 is not limited to that illustrated in FIG. 13.

When the display device 8 and the antiglare layer 9 are supported by the support member 102 as illustrated in FIG. 13, the imaging distance d between the measurement surface 7 and the optical system 3 is naturally limited.

Accordingly, by setting imaging conditions other than the imaging distance d so that S defined by Equation (1) is constant, a speckle contrast or a sparkle contrast equivalent to a speckle contrast or a sparkle contrast based on the image of the emitted light L captured at an imaging distance d that cannot be realized in the optical measurement device 1 illustrated in FIG. 13 (for example, an imaging distance greater than the dimension of the support member 102) can be measured.

Second Modification

Figure 14:
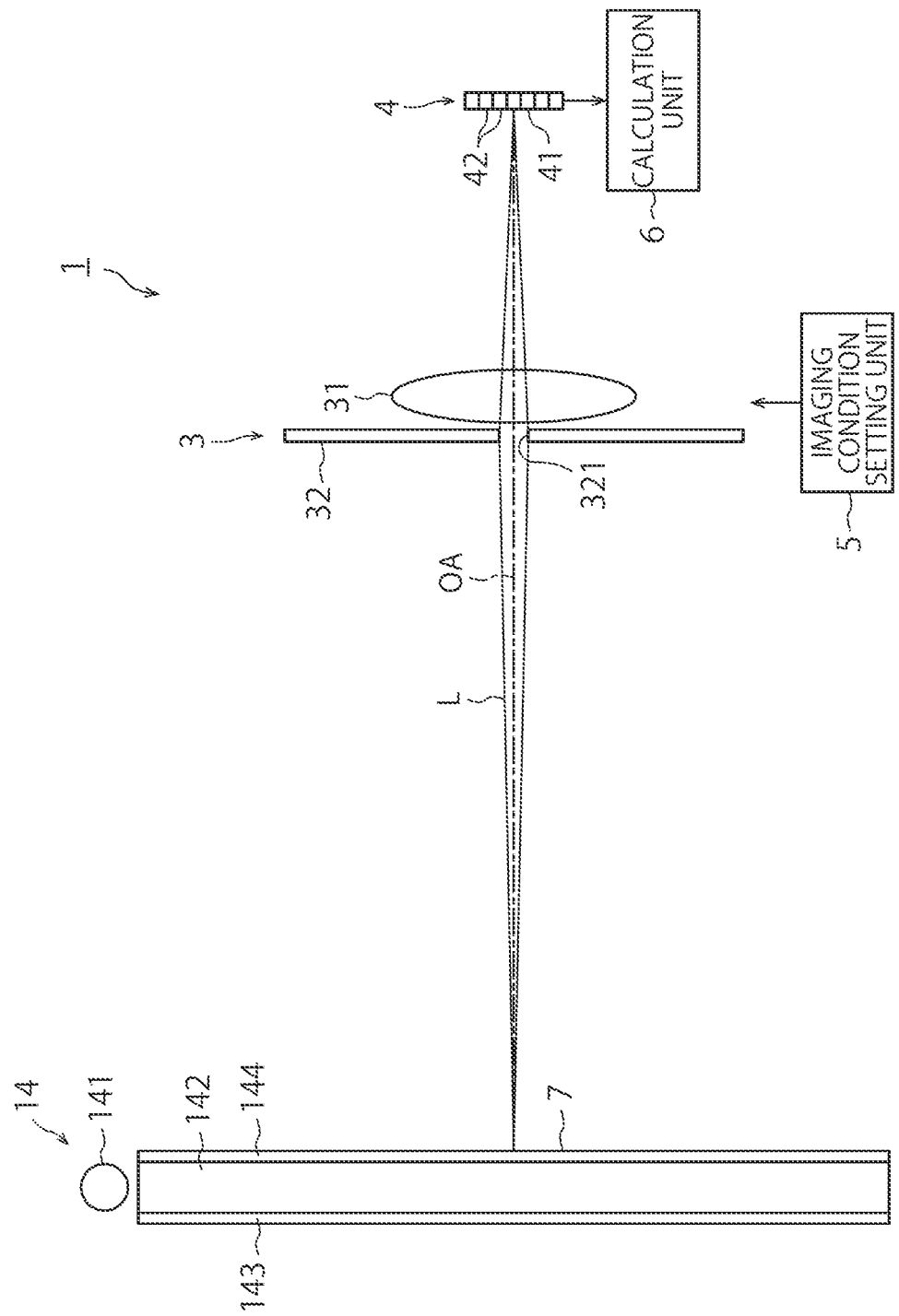
FIG. 14 illustrates a modification of an optical measurement method.

Examples in which the measurement surface 7 is a surface of the antiglare layer 9 stacked on the display device 8 have been described. However, as illustrated in FIG. 14, the measurement surface 7 may instead be an emission surface of a backlight device 14. In the example illustrated in FIG. 14, the backlight device 14 includes a light source 141, a light guide plate 142 that guides light emitted from the light source 141, a reflection plate 143 stacked on the back surface of the light guide plate 142, and a diffusion plate 144 stacked on the front surface of the light guide plate 142. The measurement surface 7 is an outer surface of the diffusion plate 144. In the example illustrated in FIG. 14, the backlight device is of an edge-light type. However, the optical measurement device 1 may instead measure the speckle contrast or the sparkle contrast of a direct-type backlight device.

Third Modification

Figure 15:
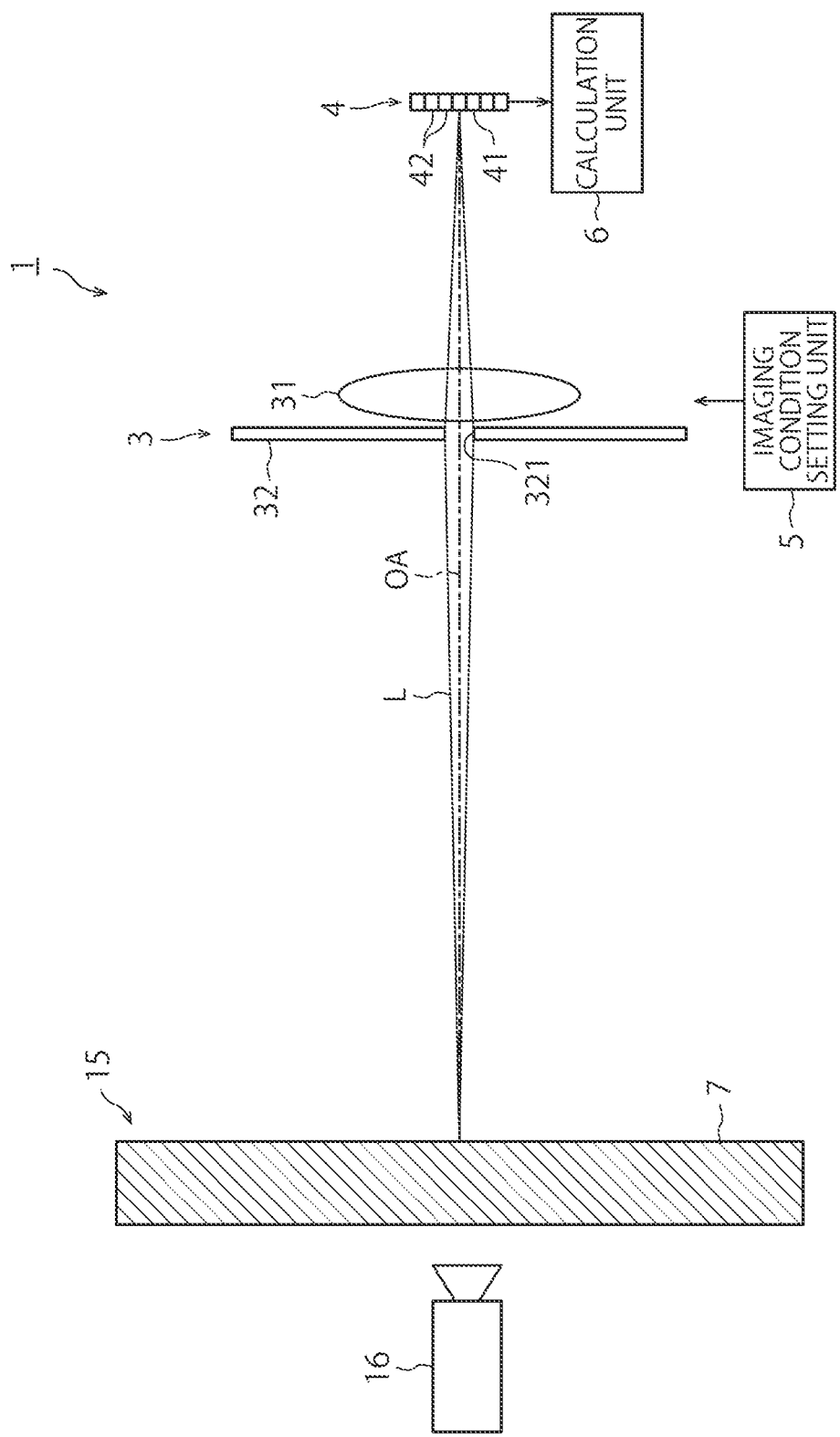
FIG. 15 illustrates another modification of the optical measurement method.

As illustrated in FIG. 15, the measurement surface 7 may instead be an emission surface of a screen 15. In the example illustrated in FIG. 15, the screen 15 is a device that transmits coherent light projected from a projector 16 to display the coherent light as an image. When the projection light is measured, speckle is generated, but no sparkle is generated. An object for which the sparkle contrast is measured is limited to a direct viewing display having an antiglare layer as described above.

The above-described modifications that are applicable to the above-described embodiment may, of course, be applied in combination with each other as appropriate.

The invention claimed is:

1. An optical measurement device comprising:
an optical system that focuses emitted light that is emitted from a measurement surface of a light emitting electronic display or a light emitting surface of which a sparkle contrast is to be measured;
a two-dimensional sensor array having a two-dimensional sensor array surface on which the emitted light is focused, the two-dimensional sensor array capturing an image of the emitted light; and
a calculation unit that calculates the sparkle contrast based on the image of the emitted light captured under an imaging condition under which a size of a light-emitting region on the measurement surface is constant, the light-emitting region contributing to formation of a diffraction limited spot of the emitted light on the two-dimensional sensor array surface,
wherein the size of the light-emitting region is determined based on a size of the diffraction limited spot and a magnification of the optical system determined by a focal length of the optical system and an imaging distance from the measurement surface to the optical system.

2. The optical measurement device according to claim 1, wherein the calculation unit calculates a sparkle contrast based on the image of the emitted light captured under a second imaging condition under which the size of the light-emitting region is equal to the size of the light-emitting region under the first imaging condition, the sparkle contrast being equivalent to a sparkle contrast based on the image of the emitted light captured under the first imaging condition.

3. The optical measurement device according to claim 2, wherein the second imaging condition differs from the first imaging condition in the imaging distance.

4. The optical measurement device according to claim 2, wherein the second imaging condition differs from the first imaging condition in the focal length of the optical system.

5. The optical measurement device according to claim 2, wherein the second imaging condition differs from the first imaging condition in an F-number of the optical system.

6. The optical measurement device according to claim 1, further comprising a mechanism that adjusts at least one of the imaging distance and the focal length of the optical system so that the size of the light-emitting region that satisfies an equation given below is constant:

[Math. 1]
$$S = \frac{R}{m} \propto \frac{F\#_{image}}{m} = F\#_{image}\frac{d}{f} = F\#_{surface} \quad (1)$$

where,
S is the size of the light-emitting region,
R is the size of the diffraction limited spot,
m is the magnification of the optical system,
$F\#_{image}$ is an F-number of the optical system at an image side,
d is the imaging distance,
f is the focal length of the optical system, and
$F\#_{surface}$ is an F-number of the optical system at a side facing the measurement surface.

7. The optical measurement device according to claim 1, further comprising a mechanism that adjusts at least one of the imaging distance, the focal length of the optical system, and an F-number of the optical system so that the size of the light-emitting region that satisfies equations give below is constant:

[Math. 2]
$$S = \frac{R}{m}\sqrt{M} \propto \frac{F\#_{image}}{m}\sqrt{M} = F\#_{image}\frac{d}{f}\sqrt{M} = F\#_{surface}\sqrt{M} \quad (2)$$

[Math. 3]
$$M = \left[\sqrt{\frac{A_c}{A_m}}\text{erf}\left(\sqrt{\frac{\pi A_m}{A_C}}\right) - \left(\frac{A_c}{\pi A_m}\right)\left\{1 - \exp\left(-\frac{\pi A_m}{A_c}\right)\right\}\right]^{-2} \quad (3)$$

where,
M is an integral parameter,
S is the size of the light-emitting region,
R is the size of the diffraction limited spot,
m is the magnification of the optical system,
$F\#_{image}$ is an F-number of the optical system at an image side,
d is the imaging distance,
f is the focal length of the optical system,
$F\#_{surface}$ is an F-number of the optical system at a side facing the measurement surface,
$A_c$ is a size of a coherent region on the two-dimensional sensor array surface,
$A_m$ is a size of uniform square detector elements on the two-dimensional sensor array surface, and
erf is a standard error function.

8. The optical measurement device according to claim 1, further comprising a support member that supports an object having the measurement surface.

9. The optical measurement device according to claim 2, wherein the calculation unit calculates the sparkle contrast equivalent to the sparkle contrast corresponding to the first imaging condition based on the image of the emitted light captured under the second imaging condition that is within a variable range of the imaging distance and that substitutes the first imaging condition that is outside the variable range of the imaging distance.

10. The optical measurement device according to claim 2, wherein the optical system includes a first lens corresponding to the first imaging condition and a second lens corresponding to the second imaging condition.

11. The optical measurement device according to claim 2, further comprising a mechanism for moving the optical system to set each of the first imaging condition and the second imaging condition.

12. The optical measurement device according to claim 1, wherein the emitted light is incoherent light or light obtained by diffusing coherent light.

13. An optical measurement method comprising the steps of:
capturing an image of emitted light by focusing the emitted light on a two-dimensional sensor array surface with an optical system, the emitted light being emitted from a measurement surface of a light emitting electronic display or a light emitting surface of which a sparkle contrast is to be measured; and
calculating the sparkle contrast based on the captured image of the emitted light,
wherein the step of calculating the sparkle contrast is performed based on the image of the emitted light captured under an imaging condition under which a size of a light-emitting region on the measurement surface is constant, the light-emitting region contributing to formation of a diffraction limited spot of the emitted light on the two-dimensional sensor array surface, and
wherein the size of the light-emitting region is determined based on a size of the diffraction limited spot and a magnification of the optical system determined by a focal length of the optical system and an imaging distance from the measurement surface to the optical system.

14. The optical measurement method according to claim 13, wherein the step of capturing the image of the emitted light includes the steps of
determining the imaging condition under which the size of the light-emitting region on the measurement surface is constant, and
adjusting the optical system to realize the determined imaging condition.

15. The optical measurement method according to claim 13, wherein the measurement surface is an emission surface of an antiglare layer of a display device including the antiglare layer.

16. The optical measurement method according to claim 13, wherein the measurement surface is an emission surface of a backlight device.

17. The optical measurement method according to claim 13, wherein the measurement surface is an emission surface of a screen on which light emitted from a projector is projected.

* * * * *